Oct. 13, 1936.                F. O. DE MILLAR                 2,057,087
              FLUID PRESSURE CONTROLLING APPARATUS
                    Filed Feb. 20, 1933          2 Sheets—Sheet 1
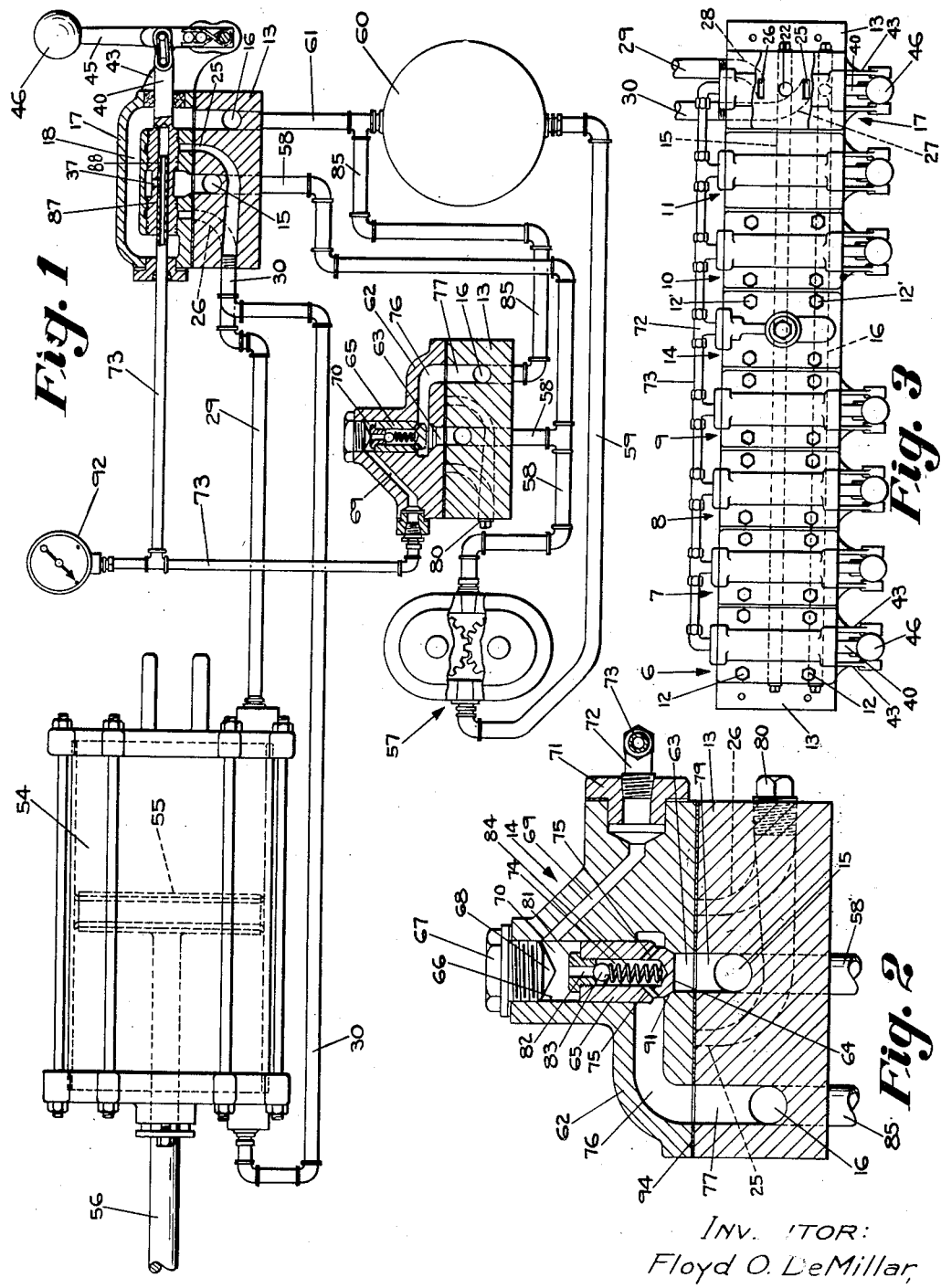
INVENTOR:
Floyd O. DeMillar,
BY
Chas. M. Nissen,
ATT'Y

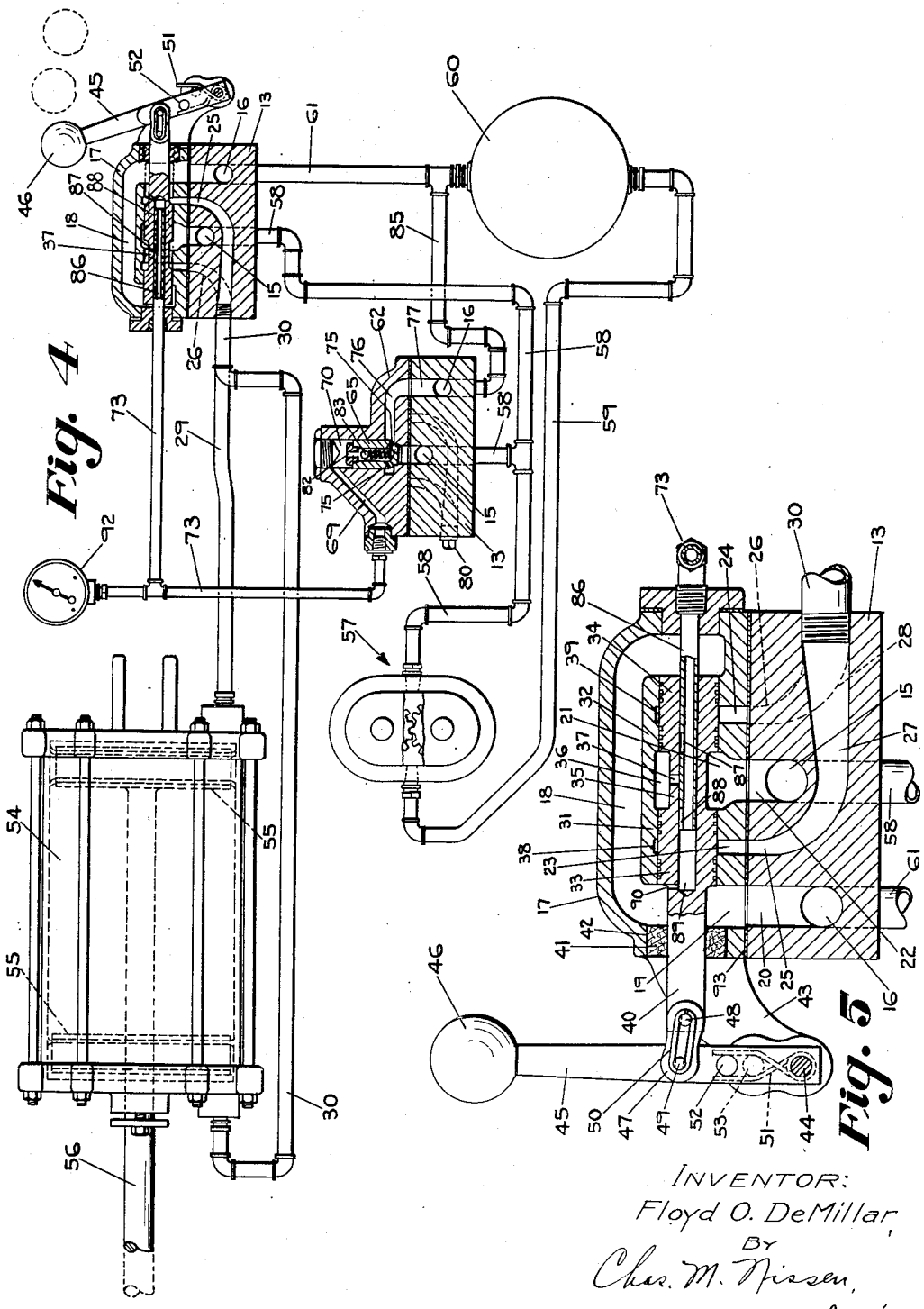

Patented Oct. 13, 1936

2,057,087

UNITED STATES PATENT OFFICE 2,057,087

FLUID PRESSURE CONTROLLING APPARATUS

Floyd O. De Millar, Granville, Ohio, assignor to The Galion Iron Works and Manufacturing Company, a corporation of Ohio Application February 20, 1933, Serial No. 657,664

26 Claims. (Cl. 60—52)

My invention relates to controlling apparatus for fluid-pressure motors and one of the objects of the invention is the provision of improved and efficient mechanism for regulating the pressure in a fluid-pressure controlling system.

Another object of the invention is the provision of an improved and efficient automatic pressure regulator to enable a pump to operate continuously at very low pressure for substantially no load when no work is to be performed.

A further object of the invention is the provision of an automatic pressure regulator connected to a fluid-pressure motor to automatically limit the pressure therein.

Another object of the invention is the provision of a fluid-pressure controlling system embodying an automatic pressure regulator which will limit the pressure in a motor and enable a pump to be operated continuously when the motor is inactive.

Other objects of the invention will appear hereinafter, the novel features and combinations being set forth in the appended claims.

In the accompanying drawings Fig. 1 is a view more or less diagrammatic of my improved pressure-controlling system embodying a pressure regulator operating automatically to limit the pressure in a fluid-pressure motor and enable a pump to be operated at substantially no load when the motor is inactive;

Fig. 2 is an enlarged sectional elevation of my improved pressure regulator mounted on a manifold;

Fig. 3 is a plan view of a plurality of controlling valves combined with the pressure regulator and mounted on a manifold;

Fig. 4 is a view similar to Fig. 1 showing the positions of the parts when the motor reaches the limit of its stroke and the pump continues to be driven at substantially no load; and Fig. 5 is an enlarged sectional elevation of the manually operated controlling valve mounted on a manifold.

In Fig. 3, I have shown seven manually operated valves designated 6, 7, 8, 9, 10, 11 and 17, detachably mounted by means of the cap screws 12, 12 on the elongated manifold block 13. Also mounted on the manifold block is one pressure regulator designated 14. The manually operated valves are each of the same construction and shown in detail in the sectional elevational view of Fig. 5. The details of the pressure regulator 14 are shown in the sectional elevational view of Fig. 2.

The manifold block 13 is provided with a supply passageway 15 which extends almost the entire length of the manifold block 13 as shown in Fig. 3. Also extending almost the entire length of the manifold block 13 is the discharge passageway 16. The supply passageway 15 and the discharge passageway 16 are common to all of the manually operated valves and are also connected to the pressure regulator 14.

Inasmuch as all of the manually operated valves are alike, a description of the construction shown in Fig. 5 will be sufficient to explain the operation of the manifold and the connections thereto. Each manually operated valve comprises a housing 17 having a chamber 18 therein which extends from one end to the other and communicates by means of the port 19 with the port 20, the latter extending downwardly to the discharge passageway 16. It should be understood that each manual valve is provided with a port 19 so that when it is mounted on a manifold block it registers with the port 20 extending through the top of the manifold block. It will thus be seen that for seven manual valves there will be seven ports 20 and seven ports 19.

A port 21 in the bottom of the housing 17 registers with a port 22 in the top of the manifold block 13, the port 22 being in communication with the supply passageway 15. On opposite sides of the port 21 are ports 23 and 24 which respectively register with the ports 25 and 26 which communicate with the motor passageways 27 and 28 leading to the rear side of the manifold block 13 at one end thereof as shown in Fig. 3. Screw-threaded into the rear side of the manifold block are motor pipes 29 and 30 as shown in Fig. 3.

Mounted in the slide bearings 31, 32 within the housing 17 is a piston valve having two cylindrical sections 33 and 34 having a connection 35 between them of reduced diameter to afford an annular chamber 36 for transmission of fluid-pressure from the port 21 to the port 37. The ports 23 and 24 may be extended to annular chambers 38 and 39 as shown in Fig. 5.

A rod 40 is connected to the piston valve and mounted to slide in the bearing 41 which is preferably of composition material, circular in shape and having a water-tight fit with the opening 42 in the front end of the housing 17.

Extending forwardly from the housing 17 is a depending bracket 43 to which is pivoted at 44 a vertical lever 45 having an actuating knob 46 at its upper end.

A link 47 is pivoted at 48 to the outer end of the rod 40 and at 49 to the lever 45. A split loop 50 of spring metal is adapted to engage flat surfaces on the pins 48 and 49 to hold the link 47 connected to the rod 40 and the lever 45.

A spring 51 is associated with the pivot pin 44 and has two upstanding arms which engage opposite sides of the pins 52 and 53, the pin 52 being on the lever 45 and the pin 53 being fixed to the bracket 43. When the lever is moved to open the valve shown in Fig. 5 the spring 51 will be placed in tension as illustrated in Fig. 4 so that when the lever is released the spring will automatically return the valve to closed position as shown in Fig. 1.

The pipes 29 and 30 are adapted to be connected to the opposite ends of the cylinder 54 of a hydraulic motor with a piston 55 movable therein. The piston 55 is connected to a piston rod 56 and the latter in turn is connected to the mechanism to be adjusted and locked in adjusted position.

A hydraulic pump 57 is connected by the supply pipe 58 to the supply passageway 15 in the manifold 13. The suction pipe 59 is connected between the pump 57 and the supply tank 60 for the pressure medium such as oil. A discharge pipe 61 connects the discharge passageway 16 in the manifold with the supply tank 60.

When the lever 45 is pushed toward the housing 17 the annular chamber 36 is connected between the supply port 22 and the motor port 26. That is to say, the connector 35 of reduced diameter is moved to such a position that communication is established between the ports 21 and 24 while the piston section 34 keeps closed the right-hand opening in the cylindrical bearing 32. At the same time that the ports 21 and 24 are connected, the movement of the left-hand piston section 33 toward the right as viewed in Fig. 5 will establish communication between the port 23 and the port 19. It should be understood that the right-hand piston section 34 may abut against the inner wall of the housing 17 to enable the operator to be assured that when he moves the lever 45 toward the housing 17 as far as it will go, the ports 23 and 24 will be completely and accurately opened so that operation of the hydraulic motor may be commenced in a minimum space of time by having full power applied thereto immediately after the manual valve is opened.

The same is true when the valve is moved in the opposite direction when the bearing 41 will act as an abutment to accurately limit the left-hand movement of the piston valve to a position where the ports 23 and 24 will be completely opened. When the piston valve is moved toward the left as viewed in Fig. 5 the supply port 21 will be connected to the motor port 23 and the flow of the pressure medium through the pipes 29 and 30 will thus be reversed and the movement of the piston 55 in the cylinder 54 will be reversed.

Whenever the lever 45 of any manual valve is released its centering springs will automatically move the valve to closed position as shown in Fig. 1. A hydraulic motor connected to the manual valve will be locked in adjusted position whenever the valve is in central and closed position. For instance, in Fig. 1 the piston 55 is midway between the ends of the cylinder 54 where it is locked against movement in either direction by the closure of the manual valve because when the latter is closed the two piston sections 33 and 34 close the ports 23 and 24 and lock the liquid in the pipes 29 and 30 and in the cylinder 54.

The pressure regulator 14 is detachably mounted by means of the cap screws 12', 12' to the central portion of the manifold block 13 as shown in Fig. 3. The pressure regulator 14 as shown in Fig. 2 comprises a housing 62 having therein a port 63 which is controlled by the lower end 64 of a vertical piston valve 65 movable vertically in the cylinder 66. This cylinder 66 is closed at its upper end by the removable screw cap 67 having a lower conical end 68 acting as an abutment to limit the upward travel of the piston valve 65 as shown in Fig. 1. The housing 62 is also provided with a passageway 69 which connects the chamber 70 at the upper end of the cylinder 66 through the connecting device 71 to the T-coupling 72, the latter being connected to the pipe 73 which in turn is connected to all of the manually operated valves as shown in Figs. 3 and 5.

As shown in Fig. 2 a central vertical bore or passageway 74 in the piston valve 65 communicates through the ports 75, 75 with the passageway 76 in the front portion of the housing 62 as illustrated in Fig. 2. The passageway 76 communicates with a port 77 in the top of the manifold block 13 and this port is connected to the discharge passageway 16 in the manifold block 13. The manifold block is also provided in its upper side with a port 79 which registers with the port 63. The pressure regulator may be placed at any position on the manifold block which is constructed to receive any of the manually operated valves when the pressure regulator is mounted in a selected position, the passageways 25 and 26 are closed by means of screw plugs, one of which is illustrated at 80 in Fig. 2.

Screw-threaded into the top of the piston valve 65 is an auxiliary valve element 81 which is provided with a central vertical opening 82, the lower end of which is adapted to be closed by means of the ball 83 below which is mounted a spring 84. Inasmuch as the bore 74 does not extend through the bottom 64 of the piston valve 65 an elongated cup is provided for the spring 84. This spring therefore is able to urge the ball valve 83 to closed position and hold it closed during operation of the hydraulic motor comprising the cylinder 54.

The operation of the pressure regulator may be understood by following in sequence the various steps in effecting the start and stopping of the hydraulic motor comprising the cylinder 54 and the piston 55. When the manual valve is in closed position as shown in Fig. 1, it will be understood that the pump 57, although running, is doing virtually no work, there being a free circulation of liquid through the pump by way of pipe 58, branch 58', past valve 65, through pipe 85, tank 60 and pipe 59. Since the pump 57 is only idling, there will be only a low pressure in the system, this low pressure in the supply pipe 58 and the branch pipe 58' being sufficient to hold the piston valve 65 in its open position as shown in Fig. 1. The pump 57 may be continuously operated while the hydraulic motor is inactive and the manual valve closed and during such time liquid will flow through the port 63 into the passageway 76 and thence through the port 77 in the manifold, the discharge passageway 16 therein and thence through the discharge pipe 85 into the tank 60. The suction side of the pump 57 is connected by means of the pipe 59 to the tank 60.

When the manual valve is moved to its open position as shown in Fig. 4 a branch low pressure connection is established between the supply pipe 58 and the chamber 70 in the upper end of the cylinder 66 of the pressure regulator, as will now be explained. By referring to Fig. 5 it will be seen that a stationary pipe 86 is connected to pipes 73 communicating with the passageway 69 in the pressure regulator. So long as the manual valve is closed the port 37 is closed, but when the manual valve is moved to open position the port 37 registers with either the port 87 or the port 88 in the stationary tube 86. The left-hand end of the tube 86 is open and extends into the central bore 89 of the piston valve and a small restricted opening 90 connects the bore 89 with the chamber 18. The restricted opening 90 prevents locking of the lever 45 by enabling the latter to be moved in either direction at any time irrespective of the confinement of liquid in the pipes 73, passageway 69 and chamber 70.

When the manual valve is moved to its open position shown in Fig. 4 the supply pipe 58 is connected through the port 37 with the port 87 and therefore a low pressure connection is established to the chamber 70 above the piston valve 65, through the chamber 36, ports 37 and 87, pipes 86 and 73, and passage 69. When this occurs the valve 65 is still in its open position as shown in Fig. 1, but the hydraulic pressure after opening of the manual valve being exerted with substantially equal force at both ends of the piston valve 65, the latter will be able to drop by gravity, or if the forces acting on the ends of the piston valve 65 should be unequal the weight of the valve will nevertheless be sufficient to cause the same to move downwardly to its closed position as shown in Fig. 4.

By referring to Fig. 2 it will be seen that the lower end 64 of the piston valve 65 is of less cross-sectional area than the cross-sectional area of the cylinder 66. The annular seat 91 surrounds the port 63 which is of the same cross-sectional area as the lower end 64 of the valve 65. Therefore if the valve is closed as shown in Figs. 2 and 4 the pressure on the top will be greater than the pressure exerted on the lower end 64, thus holding the valve 65 in its closed position. The low pressure passageway 76 being now closed, the flow through the low pressure pipes 58' and 85 will be discontinued and the continued operation of the pump 57 will build up sufficient pressure to cause the liquid to be forced into the pipe 29 at the right-hand end of the cylinder 54 as viewed in Fig. 4. The piston 55 will therefore be moved toward the left and the liquid at the left of the piston 55 will flow through the pipe 30 into the discharge pipe 61 and thence into the tank 60. During the movement of the piston 55 pressure will be exerted through the pipes 73 and passageway 69 to hold the valve 65 in its closed position shown in Figs. 2 and 4.

When the piston 55 reaches the end of its stroke and the manual valve still remains in its open position shown in Fig. 4 the pump 57 may continue to operate because the ball check valve 83 limits the pressure in the cylinder 54. When the pressure exceeds the pre-determined limit the check valve 83 will be lowered against the spring 84 and liquid will be by-passed through the center of the valve 65 and the ports 75 into the passageway 76 to the pipe 85 and thence into the tank 60.

As soon as the manual valve is closed the port 37 will be closed and consequently the continually operating pump 57 can supply the liquid in the pipe 58 to no other passageway than that designated 76. An impulsive force will therefore be exerted on the lower end 64 of the valve 65 to move the latter upwardly to its position shown in Fig. 1. If the ball check valve 83 happens to be closed at the time such impulsive force is exerted the confinement of the liquid in the pipes 73, passageway 69, and the chamber 70 will effect opening of the check valve while the piston valve 65 is being moved to its upper position shown in Fig. 1, whereupon said check valve will automatically close and the relatively low pressure from the pump will hold the valve 65 in its upper position while the pump continues to be driven at substantially no load or at very low pressure, thereby economizing in the consumption of fuel of the engine or other motive power used for driving the pump 57.

A pressure gauge 92 may be connected to the pipes 73 as shown in Figs. 1 and 4, so that whenever the manual valve is open the operator may determine by observing the pressure gauge whether the pump 57 is operating properly or the check valve is opening at the predetermined pressure.

It should be understood that the supply pipe 58 and the connections between the same and the hydraulic motors through the manually operated valves and the connections to the top of the pressure regulator should always be completely filled with liquid so that the pressure regulator will act very quickly upon the opening of the manual valve to secure quick starting of the hydraulic motor to which such operated manual valve is connected. To assure such complete filling of the connections with liquid the manifold is provided with sealing gaskets 93 and 94 between the housings of the manual valves and the manifold 13 and between the housing of the pressure regulator and the manifold 13. Whenever a manual valve is moved to one open position or another, the ports 23 and 24 will be completely opened and when the knob 46 is released the centering springs will move the piston sections 33 and 34 so as to occupy the position shown in Fig. 5, which positions are symmetrical with respect to the ports 23 and 24, thereby assuring that the piston 55 of the corresponding hydraulic motor will be locked in adjusted position.

Obviously those skilled in the art may make various changes in the details and arrangement of parts without departing from the spirit and scope of the invention as defined by the claims hereto appended, and I wish therefore not to be restricted to the precise construction herein disclosed.

Having thus described and shown an embodiment of my invention, what I desire to secure by Letters Patent of the United States is:

1. In a fluid-pressure system, the combination with a fluid-pressure motor comprising a cylinder and a piston, of a fluid-pressure pump, a valve for said motor, connections between the pump and said motor through said valve and between said motor and the return line to said pump, said piston being locked in said cylinder when said valve is closed, a by-pass between said valve and the said return line, a pressure regulator comprising a relief valve in said by-pass, and means comprising ports in said first mentioned valve for connecting said cylinder on the pressure side of said piston to said relief valve to cause the latter to open to limit the pressure in said cylinder while said first-named valve is open.

2. In a fluid-pressure system, the combination with a fluid-pressure pump, of a low-pressure by-pass, an automatic valve for controlling said low-pressure by-pass, a main valve for controlling the high pressure supply from said pump, and means connected between said main valve and said automatic valve to equalize the fluid-pressure above and below said automatic valve and permit the latter to close automatically by gravity when said main valve is opened, the said pump operating under substantially no load upon closing the main valve.

3. In a fluid pressure system, the combination with a fluid pressure pump, of a fluid pressure motor, supply pipe connections between the pump and the motor, a main valve for controlling the fluid pressure action on the motor, a fluid pressure regulator interconnected with the valve and pump, an unobstructed low pressure by-pass between the regulator and supply side of the pump, and a piston valve in the regulator adapted to be lifted by low pressure from the pump when the said main valve is closed thereby maintaining the by-pass freely open as the pump idles, while automatically dropping to close the by-pass when the main valve is open, to enable the pump to build up motor-operating pressure in the supply pipe connections between the pump and motor for operating the latter when the main valve is open.

4. In a fluid pressure system, the combination with a fluid pressure pump, of a fluid pressure motor, supply pipe connections between the pump and the motor, a main valve for controlling the fluid pressure action on the motor, a fluid pressure regulator interconnected with the valve and pump, an unobstructed low pressure by-pass between the regulator and supply side of the pump, and fluid responsive means in the regulator for maintaining the by-pass open under substantially no pressure from the pump when the said main valve is closed, while automatically closing the said by-pass when the said main valve is open, the pump thereby idly operating under substantially no load when the main valve is closed, but building up motor-operating pressure in the said supply pipe connections between the pump and motor to operate the latter when the said main valve is open.

5. In a fluid pressure system, the combination with a fluid pressure pump, of a fluid pressure motor, supply pipe connections between the pump and the motor, a main valve for controlling the fluid pressure action on the motor, a fluid responsive fluid pressure regulator interconnected with the main valve and pump, an unobstructed low pressure by-pass between the regulator and supply side of the pump, and means operative responsively to operation of the said main valve for operatively connecting and disconnecting the by-pass with the pump as the said main valve is closed and opened, thereby enabling the pump to circulate fluid freely through the by-pass under substantially no load when the main valve is closed while building up sufficient pressure when the main valve is open through the supply pipe connections between the pump and motor to operate the motor, the said by-pass being operatively disconnected from the pump while the motor is operating.

6. In a fluid pressure system, the combination with a fluid pressure pump, of a fluid pressure motor, supply pipe connections between the pump and the motor, a main valve for controlling the fluid pressure action on the motor, a fluid pressure regulator interconnected with the valve and pump, an unobstructed low-pressure by-pass between the regulator and supply side of the pump, a piston valve in the regulator adapted to be lifted by very low pressure from the pump when the main valve is closed, thereby affording a continuous free circulation of fluid through the by-pass responsive to closing the main valve and relieving the pump of substantially all work while the main valve is closed, the said piston valve automatically dropping to close the by-pass when the main valve is open to enable the pump to build up motor operating pressure in the supply pipe connections between the pump and motor for operating the latter when the main valve is open, and a pressure-relief valve within the said piston valve adapted to relieve the said motor of excessive pressure from the pump.

7. In a fluid pressure system, the combination with a fluid pressure pump, of a fluid pressure motor, supply pipe connections between the pump and the motor, a main valve for controlling the fluid pressure action on the motor, a fluid pressure regulator interconnected with the valve and pump, an unobstructed low pressure by-pass between the regulator and supply side of the pump, a piston valve in the regulator adapted to be lifted by very low pressure from the pump when the main valve is closed, thereby affording a continuous free circulation of fluid through the by-pass responsive to closing the main valve thus relieving the pump of substantially all work while the main valve is closed, the said piston valve automatically dropping to close the by-pass when the main valve is open to enable the pump to build up motor-operating pressure in the supply pipe connections between the pump and motor for operating the latter when the main valve is open, a pressure relief valve within the piston valve for relieving the motor of excessive pressure, a spring normally holding the relief valve closed, there being a chamber defined above the piston valve between the valve and top of the distributor housing, and connections between the main valve and said chamber constituting a low pressure relief passage for enabling fluid to open the said relief valve and to pass through the said piston valve into the said low pressure by-pass.

8. In a fluid pressure system, the combination with a low pressure discharge by-pass, of a valve for controlling a port in said by-pass, a piston connected to the valve, piping connections for controlling the operation of the piston to effect closure of the port when the low pressure by-pass is to be closed, a fluid pressure pump, a main valve, and means for maintaining the by-pass open under substantially no pressure from the pump when the main valve is closed while automatically closing the by-pass when the main valve is open, the pump thereby idly operating under substantially no load when the main valve is closed, but building up pressure when the main valve is open, the port in the by-pass being unrestricted to enable free flow of the fluid through the by-pass when the port is open while the pump operates under substantially no load.

9. In a fluid pressure system, the combination with a fluid pressure pump, of a fluid pressure motor, supply pipe connections between the pump and the motor, a valve for controlling the fluid pressure action on the motor, an unrestricted low pressure by-pass pipe connected to the pressure side of the pump, a fluid pressure controlled regulator operated automatically to close the low pressure by-pass pipe when the valve is in position to cause the pump to supply fluid pressure to the motor, and means for maintaining the by-pass open under substantially no pressure from the pump when the valve is closed while automatically closing the by-pass when the main valve is open, the pump thereby idly operating under substantially no load when the valve is closed, but building up motor operating pressure between the pump and motor to operate the latter when the valve is open.

10. In a fluid pressure system, the combination with a pump, of an unrestricted low pressure by-pass connected thereto, a motor, a valve between the pump and the motor, a pressure regulator, and piping connections controlled by operation of said valve to supply fluid under pressure to said regulator thereby to cause the pressure regulator to close the by-pass when the valve is open and the pump is operating the motor, the pump idly operating under substantially no load when the valve is closed, but building up motor operating pressure between the pump and motor to operate the latter when the valve is open.

11. In a fluid pressure system, the combination with a pump, of a low pressure by-pass, a motor, a valve for the motor, and a fluid operated fluid pressure regulator connected to the by-pass and also to the valve to effect closure of the by-pass when the valve is opened to connect the pump to the motor, the by-pass affording unobstructed flow of fluid when the valve is closed, thereby enabling the pump to circulate fluid freely through the by-pass under substantially no load when the valve is closed while building up sufficient pressure when the valve is open through the connections between the pump and motor to operate the motor, the said by-pass being operatively disconnected from the pump while the motor is operating.

12. In a fluid pressure system, the combination with a pump, of a motor, a valve for the motor, a by-pass regulator operable when the valve is open to limit the fluid pressure in the motor, and mechanism associated with the regulator adapted to be operated by low pressure from the pump when the valve is closed to maintain the by-pass freely open as the pump idles while automatically closing the by-pass when the valve is open to enable the pump to build up motor operating pressure in the supply pipe connections between the pump and motor for operating the latter when the valve is open.

13. In a fluid pressure system, the combination with a pump, of a motor, connections between the pump and the motor, a valve for controlling the supply of pressure medium from the pump to the motor, an unobstructed low pressure supply pipe connected between the supply side of the pump and the return line, and an automatic valve adapted to be opened when the first-named valve is closed and to remain open while the first-named valve remains closed to enable the pump to be operated continuously at low pressure while the first-named valve is closed, the said automatic valve including a piston adapted to be lifted by low pressure from the pump when the first-named valve is closed thereby maintaining the by-pass freely open as the pump idles, while automatically dropping to close the by-pass when the main valve is open to enable the pump to build up motor operating pressure in the supply pipe connections between the pump and motor for operating the latter when the main valve is open.

14. In a fluid regulator, the combination with a continuously operated fluid pressure pump, of a fluid pressure motor, a valve for controlling the motor, a fluid pressure regulator including a cylinder, connections including a pressure supply line leading to one end of said cylinder and a return line leading to the other end thereof to cause the regulator to act automatically to enable the pump to operate at very low pressure when the motor is inactive and to operate at high pressure when the motor is being operated, a manifold for the supply and return lines connected to the valve and to the regulator, and a piston valve in the regulator cylinder adapted to be lifted by low pressure from the pump when the valve is closed while automatically dropping to close the by-pass when the valve is open, to enable the pump to build up motor operating pressure in the supply pipe connections between the pump and motor for operating the latter when the valve is open.

15. In a fluid pressure system, the combination with a continuously operating pump, of a plurality of fluid pressure motors, a plurality of valves one for each of the motors, fluid pressure regulating valve mechanism for enabling the pump to be continuously operated at very low pressure when all of the motor valves are closed and all of the motors are inactive and for automatically limiting the pressure in any motor when its valve is open and the pump is operating at maximum pressure, connections between the aforesaid parts, a manifold block for some of the connections and for supporting the valves and the fluid pressure regulating valve mechanism, and a piston valve associated with the regulating valve mechanism adapted to be lifted by the very low pressure from the pump upon closing of the corresponding motor valve, thereby affording a continuous free circulation of fluid through the by-pass responsive to closing the main valve thus relieving the pump of substantially all work while the motor valve is closed, the piston valve automatically dropping to close the by-pass when the motor valve is open to enable the pump to build up motor operating pressure in the supply pipe connections between the pump and motor for operating the latter when the motor valve is open, a pressure relief valve within the piston valve for relieving the motor of excessive pressure, a spring normally holding the relief valve closed, there being a chamber defined above the piston valve between the valve and top of the distributor housing, and connections between the main valve and the chamber constituting a low pressure relief passage for enabling fluid to open the said relief valve and to pass through the piston valve into the low pressure by-pass.

16. In a fluid pressure system, the combination with a fluid pressure pump, of a fluid pressure operated motor, a conduit connecting said pump and said motor, a valve in said conduit for controlling the flow of fluid from said pump to said motor, a low pressure by-pass for said pump adapted to allow operation thereof at substantially no-load, a valve in said by-pass, means for biasing said valve to by-pass-closing position, means for applying the pressure of said fluid continuously to said valve to urge it to by-pass-opening position against said bias means, and means for closing said by-pass valve responsive to operation of said first-named valve.

17. In a fluid pressure system, the combination with a fluid pressure pump, of a fluid pressure operated motor, a conduit connecting said pump and said motor, a valve in said conduit for controlling the flow of fluid from said pump to said motor, a low pressure by-pass for said pump adapted to allow operation thereof at substantially no-load, a valve in said by-pass, means for biasing said valve to by-pass-closing position, means for applying the pressure of said fluid continuously to said valve to urge it to by-pass-opening position against said bias means, and means for applying counterpressure to said by-pass responsive to operation of said first-named valve.

18. Fluid control means comprising a pair of conduits, a valve connected thereto for controlling communication therebetween comprising a cylinder, inlet and outlet ports in said cylinder communicating with said conduits, a piston in said cylinder, means for biasing said piston to valve closing position, one head of said piston being movable under pressure at said inlet port to move said piston to valve opening position, a third port in said cylinder communicating with the other head of said piston whereby when pressure is applied thereto the piston will move to valve closing position, said piston having a passageway adapted to establish communication between said third port and said outlet port, and a relief valve in said passageway tending to maintain said passageway normally closed and to open said passageway responsive to a high pressure at said third port.

19. Fluid control means comprising a pair of conduits, a valve connected thereto for controlling communication comprising a cylinder, inlet and outlet ports leading to and from said cylinder and communicating with said conduits, the inlet port having a bore smaller than the cylinder, a piston in said cylinder having one face of reduced size adapted to close said inlet port, said piston being biased to inlet port closing position only by the action of gravity thereon, the reduced size face of said piston being movable under relatively low pressure to open said inlet port, a third port in said cylinder communicating with the large face of said piston whereby when pressure is applied thereto the piston will move to close said inlet port, said piston having a passageway adapted to establish communication between said third port and said outlet port, and a spring pressed relief valve in said passageway biased to maintain said passageway normally closed and adapted to be opened only in response to a high pressure at said third port.

20. In apparatus for operating a fluid-pressure motor, the combination with a fluid-pressure motor comprising a cylinder and a piston, of a pump connected to said cylinder, means for operating said pump continuously, a valve for controlling the starting and stopping of said motor, a supply tank, by-pass valve mechanism comprising a valve plunger urged to a by-pass closing position solely by the influence of gravity for controlling a by-pass between the supply side of said pump and said supply tank, and means operative upon the opening of said motor control valve for appreciably increasing the force urging said valve plunger to a by-pass closing position.

21. In apparatus for operating a fluid-pressure motor, the combination with a fluid-pressure motor, of a continuously operated pump connected to said motor, a motor control valve interposed between said pump and said motor for controlling the starting and stopping of the latter under the influence of the former, a by-pass valve for said pump for controlling the by-passing of fluid from said pump, said by-pass valve comprising a plunger normally urged to by-pass closing position but urged to by-pass opening position under the influence of said pump when said motor control valve is closed, and means operative upon the opening of said motor control valve to simultaneously close said by-pass valve.

22. In apparatus for operating a fluid-pressure motor, the combination with a fluid-pressure motor, of a pump for operating said motor, and pump by-pass mechanism comprising a plunger urged to closing position solely by the influence of gravity, said plunger including a reverse check valve device to minimize the shock and jar when said motor is stopped in adjusted position.

23. In apparatus for operating fluid-pressure motors, the combination with a plurality of fluid-pressure motors, of a plurality of operating valves, one for each of said motors, a manifold affording passageways to said valves and banking said valves adjacent an operator's station, a pump, a motor for operating said pump continuously, a low-pressure by-pass for enabling said pump to operate at substantially no-load, a delivery conduit between said pump and said manifold, a pressure regulator comprising a valve biased to a by-pass closing position for controlling said low-pressure by-pass, and means connected between said pressure regulator and said operating valves for causing said by-pass valve to close the by-pass when one of said operating valves is moved to position to effect operation of its corresponding motor and for causing said by-pass valve to open said by-pass when such operated valve is moved back to initial position.

24. In apparatus for operating a fluid-pressure motor, the combination with a hydraulic motor, of a pump, means for operating said pump continuously, means including a valve connected between the pump and the motor for controlling the starting and stopping of the latter, a pressure regulator comprising a valve biased to a closing position by gravity for controlling a by-pass around said pump, said by-pass being free and unobstructed when said last-named valve is open and the pump is idling, and means for effecting automatic closure of said by-pass valve, said means comprising a conduit connected to the pump pressure supply line when said first-named valve is in a position to effect operation of said motor.

25. In apparatus for operating a fluid-pressure motor, the combination with a hydraulic motor, of a pump, means for operating said pump continuously, means including a valve connected between the pump and the motor for controlling the starting and stopping of the latter, a pressure regulator comprising a valve biased to a closing position for controlling a by-pass around said pump, said by-pass being free and unobstructed when said last-named valve is open and the pump is idling, and means for effecting automatic closure of said by-pass valve, said means comprising a conduit connected to the pump pressure supply line when said first-named valve is in a position to effect operation of said motor.

26. In apparatus for operating a fluid-pressure motor, the combination with a hydraulic motor comprising a cylinder and a piston, of a pump, means including a valve for connecting said pump to said cylinder to control the starting and stopping of said piston, a supply tank, a low-pressure by-pass conduit connected between said pump and said supply tank, a valve for controlling the flow of fluid through said by-pass, a spring-pressed check-valve carried by said by-pass valve for controlling the flow of fluid through said by-pass valve into said by-pass from that end of said by-pass valve remote from said by-pass, and a conduit between the said remote end of said by-pass valve and said first-named valve for connection to the supply line when the first-named valve is moved to motor-operating position, such connection to the supply line effecting automatic closure of the by-pass valve and also effecting automatic opening of said check-valve to relieve the pressure in said motor when it reaches a predetermined maximum.

FLOYD O. DE MILLAR.